Feb. 7, 1950  A. WOLF  2,496,648
SEISMIC EXPLORATION SYSTEM FOR
DETERMINATION OF STRATA DIPS
Filed June 24, 1943

ALEXANDER WOLF
INVENTOR

BY
HIS ATTORNEY

Patented Feb. 7, 1950

2,496,648

UNITED STATES PATENT OFFICE 2,496,648

SEISMIC EXPLORATION SYSTEM FOR DETERMINATION OF STRATA DIPS

Alexander Wolf, Houston, Tex., assignor to Texaco Development Corporation, New York, N. Y., a corporation of Delaware Application June 24, 1943, Serial No. 492,025

5 Claims. (Cl. 181—0.5)

1

This invention relates to seismic exploration of the earth and more particularly to a method and an apparatus by means of which the recording apparatus can be controlled so as to eliminate seismic waves arriving at the surface at any angle to the vertical, without materially affecting the sensitivity to waves arriving at a different angle.

The principal object of the invention is to provide a seismic exploration system by use of which it is possible to detect waves reflected from steeply dipping formations in the presence of reflections from gently dipping formations, or conversely one to accentuate waves reflected from gently dipping formations by eliminating superimposed waves from steeply dipping formations.

In a copending application of the same inventor, Serial No. 483,750, filed April 20, 1943, now Patent No. 2,431,600, granted November 25, 1947, a seismic system has been disclosed which discriminates against waves reflected from horizontal or gently dipping beds so that superimposed reflections from steeply dipping beds may appear clearly on the record. In accordance with the disclosure in the copending application, an arrangement of detectors is employed which secures a record of the differences between the outputs of pairs of detectors placed in line on the surface of the ground. The detectors are connected to a recording device either directly or through an amplifier in such a manner that the outputs of the detectors are in opposition. In this manner waves reflected from a horizontal formation strike the detectors at about the same time so that the net output is almost zero, whereas a wave reflected from a steeply dipping bed strikes the detectors some time interval apart and thus there is little decrease in the sensitivity to the waves reflected from the steeply dipping formations.

While the arrangement described in the foregoing paragraph is usually satisfactory, there are occasions when it is not effective. So-called weathering differences between the outputs of the various detectors sometimes produce time shifts in the outputs of these detectors so that reflections from substantially horizontal beds are not canceled satisfactorily. Again, it is not infrequent that the reflections which it is desired to eliminate may be coming from a bed or beds which are far from horizontal so that the method described in the preceding paragraph fails to eliminate them.

In accordance with the present invention a seismogram is obtained in the conventional manner except that instead of recording the output of the detectors in the form of a wavy line on paper or film, the outputs of the detectors are recorded on multiple "sound" tracks on a film strip such as are employed in the motion picture industry. The record is then passed in front of a beam or beams of light passing through a system of slits arranged substantially laterally of the film strip and light passing through any two of the tracks and their corresponding slits is caused to fall upon two light-sensitive devices such as photoelectric cells. A device such as a recording galvanometer connected to the two photoelectric cells records the difference between the outputs of the two photoelectric cells. By thus recording the difference in light passing through predetermined pairs of slits and tracks one obtains a record very similar to that obtained by means of the method and apparatus disclosed in the aforementioned Patent No. 2,431,600. In those cases, however, where difficulty is encountered because of weathering differences or because of appreciable dip of the beds, reflections from which it is desired to eliminate, the slits may be displaced with respect to each other and in a direction longitudinally of the film strip. By varying the amount of this displacement of the slits, waves arriving at substantially any angle can be canceled and regardless of the small time shift introduced by weathering.

For a better understanding of the invention reference may be had to the accompanying drawing in which:

Figure 3 is a somewhat diagrammatic view of an apparatus for carrying out the method; while

Figure 1:
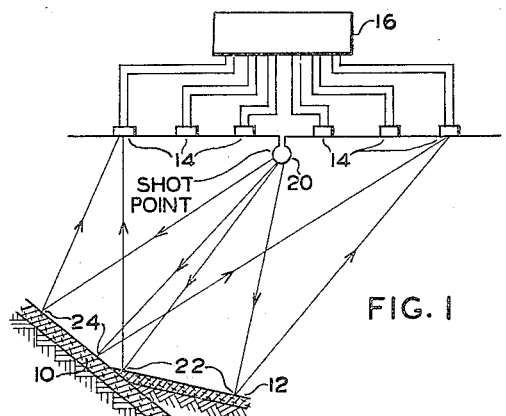
Figure 1 is a diagrammatic view of a vertical section through a portion of the earth showing a seismic shot point and a series of detectors arranged in a conventional manner for obtaining reflections from a bed, a portion of which is steeply sloping while another portion dips less steeply.
Figure 2:
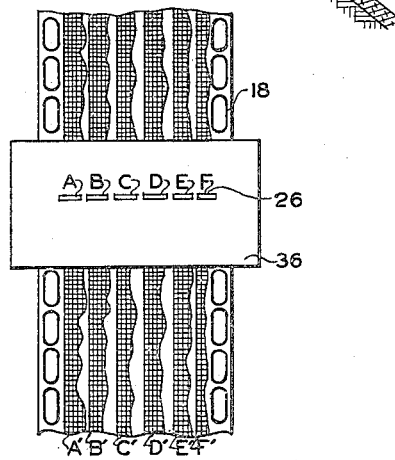
Figure 2 is a view of a section of a seismogram showing a system of slits arranged transversely or laterally of the film strip and the "sound" tracks thereon.

Referring to the drawing, Figure 1 shows a vertical section through the flank of an anticline having a steeply sloping portion 10 and a less steeply dipping portion 12. A series of detectors 14 is arranged along the surface of the ground, these detectors being connected to a suitable recording device 16 which is capable of recording the outputs of the detectors in the form of "sound" tracks on a moving film strip 18, as is shown in Figure 2. Each track comprises a narrow opaque area, the width of which varies with the output of the instrument, the record of which is being made, as is well known in the art.

Considering the two detectors 14 farthest from the shot point 20 it will be noted that, if an explosive charge is fired at the shot point, reflections from points 22 on the less steeply dipping portion 12 of the formation will arrive at the two detectors at substantially the same time as the reflections from points 24 on the steeply sloping portion 10 of the formation—assuming that the distance from the shot point 20 to the points 24 and then to the first two detectors 14 is approximately the same as the distance from the shot point to the points 22 and then to the same detectors.

A record obtained by means of the detectors 14 and the recording device 16 often becomes so complicated because of the superimposing of the reflections that it is impossible to distinguish the various reflections. In accordance with the present invention, the detectors 14 are connected to the recording device 16, either directly or through an amplifier, not shown; the shot is fired and the reflections received in the conventional manner with the exception that, as is stated above, the record is in the form of a plurality of parallel tracks on a film strip, each track representing the output of one of the detectors 14. It is to be understood that the detectors do not have to be arranged as shown in Figure 1 since any conventional arrangement can be employed. In particular, for each detector one may substitute a more or less closely spaced group of detectors connected in series or in parallel. For the purposes of the invention which is described, any such group may be considered to be a single detector, as is well known in the art.

After the record 18 has been made, it is passed longitudinally past a system of slits 26, the slits being arranged so that one will be opposite each track on the record 18. Light from a source such as a lamp 28 is caused to pass through the film strip 18 and the slits 26 and is then focused as by means of a lens 30 so that light passing through a predetermined pair of the slits such as A and C will strike a pair of photoelectric cells 32. The cells 32 are connected in opposition to a suitable recording device such as a recording galvanometer 34. Amplifiers may of course be inserted into the connection between the light-sensitive devices and the galvanometer. It will be seen that with this arrangement each of the photoelectric cells 32 responds to variations in light passing through one of the tracks on the record 18 and through its corresponding slit 26. The galvanometer 34 will therefore record the difference between the output of the two photoelectric cells 32 and thus the difference between the outputs of the pair of detectors 14 which were connected to the device 16 to produce the two tracks A' and C' being analyzed. By recording in sequence the difference in light passing through slits A and B, B and C, C and D, etc., arranged as shown in Figure 2, a record is obtained of the differences in outputs of the various pairs of detectors, the tracks of which are indicated respectively at A' and B', B' and C', C' and D', etc. In this manner seismic waves arriving almost vertically to the surface, such as waves reflected from nearly horizontal formations, can be eliminated completely without materially affecting the sensitivity to waves arriving at an appreciable angle to the surface. It is readily seen that with the slits arranged transversely to the record, as shown in Figure 2, the method accomplishes no more than the method described in the aforementioned Patent No. 2,431,600, in which differences between the simultaneous outputs of the various detectors are recorded directly.

Figure 4:
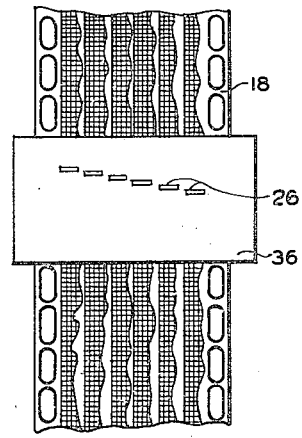
Figure 4 is a view similar to Figure 2 but in which the slits are slightly displaced longitudinally of the film strip.

In case, however, weathering introduces time shifts between the various detectors, or the waves, which it is desired to eliminate, arrive at an angle to the vertical, perhaps because they are reflected from beds lying at an appreciable angle to the horizontal, such as 12 in Figure 1, then it is merely necessary to displace the slits as shown in Figure 4 longitudinally to the film strip 18, by amounts corresponding to the time differences for which it is desired to compensate. Thus, for instance if the film speed in the recording galvanometer is 10 inches per second, 1/100 inch of the record corresponds to one millisecond. If it is noted by means well known in the art, that trace A is shifted relative to trace B by one millisecond because of "weathering," slit A would be shifted in the proper direction 1/100 inch relative to slit B. In addition, if one wishes to eliminate waves arriving from formations such as 12 in Figure 1, one would calculate, or observe, the time differences between the arrival of this wave at the successive detectors, and would shift the slits A, B, C, etc., relative to each other by the corresponding amounts, as shown in Figure 4.

Figure 3:
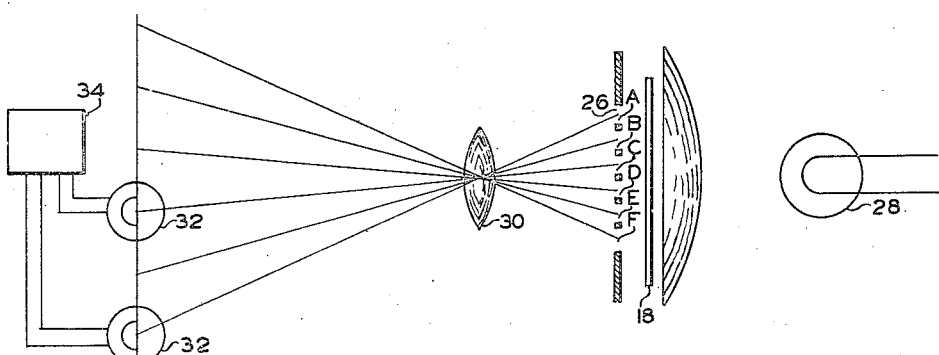

It is understood, of course, that the same purpose can be accomplished by having the "sound" tracks on the original seismogram in the form of variable density strips, such as used in certain types of motion picture sound recording. One may also produce the original record in the form of areas of different magnetization on magnetic tape or wires, or any other means of sound reproduction. Obviously, where magnetic means of recording is employed, the light beams and light-sensitive devices of Figure 3 would be replaced by devices sensitive to variations in the magnetic field. Instead of shifting the light beams by means of the slit 26, the pole pieces of magnetic detector devices would then be shifted. If mechanical recording were employed, one would obviously shift the position of the "pick-up" arms longitudinally to the record. In any of the forms of this invention one may also shift the various tracks relative to each other, rather than displacing the position of the play-back devices.

Obviously many modifications and variations of the invention, as hereinbefore set forth, may be made without departing from the spirit and scope thereof, but only such limitations should be imposed as are indicated in the appended claims.

I claim:

1. A method of seismic prospecting wherein it is desired to record seismic waves propagated to the surface at an angle to the vertical and to eliminate waves propagated to the surface at a different angle, which comprises positioning a pair of seismic wave detectors in separated relation at the earth's surface, generating seismic waves at a point on the earth's surface, recording the outputs of said detectors in the form of parallel opaque tracks on a moving film, the width of each track indicating the output of a detector at any instant, subsequently converting said tracks to electrical currents having amplitudes corresponding to a characteristic of said tracks, and measuring the difference in said currents.

2. A method of seismic prospecting wherein it is desired to record seismic waves propagated to the surface at an angle to the vertical and to eliminate waves propagated to the surface at a different angle, which comprises positioning a plurality of seismic wave detectors in separated relation along the earth's surface, generating seismic waves at a point on the earth's surface, recording the outputs of said detectors in the form of parallel "sound" tracks on a moving film, subsequently converting said tracks to electrical currents having amplitudes corresponding to a characteristic of said tracks, measuring the difference in the amplitudes of said currents, and repeating this operation to measure the differences in the amplitudes of currents corresponding to other pairs of tracks.

3. In a seismic exploration system for suppressing reflections propagated to the surface at an angle to the vertical without materially reducing sensitivity to reflections arriving at a different angle, a source of seismic waves, a plurality of seismic wave detectors having substantially identical sensitivity and disposed in spaced relation along the earth's surface, a source of seismic waves, means for recording the outputs of said detectors in the form of "sound" tracks on a moving film strip, means for directing a narrow beam of light laterally through the film strip to a series of light sensitive devices, the light passing through each of a pair of said tracks falling upon one of a pair of said light sensitive devices, means for recording the differences in the outputs of the pairs of light sensitive devices, and means for slightly displacing the beam of light passing through one of a pair of tracks in a direction longitudinally of the film strip.

4. In a seismic exploration system for suppressing reflections propagated to the surface at an angle to the vertical without materially reducing sensitivity to reflections arriving at a different angle, a source of seismic waves, a pair of seismic wave detectors disposed in spaced relation at the earth's surface and in alignment with said source, a recording device for recording the outputs of said detectors in the form of parallel "sound" tracks on a moving film strip, a source of light, means for directing a beam of light through said film laterally thereof, a shield member in the path of said light beam, said shield having a pair of narrow slits disposed laterally across said film strip, one of said slits being opposite each of said tracks, a light sensitive device in the path of light passing through each track and its respective slit, and a second recording device connected to measure and record the differences in the outputs of said light sensitive devices.

5. In a seismic exploration system for suppressing reflections propagated to the surface at an angle to the vertical without materially reducing sensitivity to reflections arriving at a different angle, a source of seismic waves, a pair of seismic wave detectors disposed in spaced relation at the earth's surface and in alignment with said source, a recording device for recording the outputs of said detectors in the form of parallel "sound" tracks on a moving film strip, a source of light, means for directing a beam of light through said film laterally thereof, a shield member in the path of said light beam, said shield having a plurality of narrow slits disposed across said film strip in more or less lateral directions, each successive slit being displaced slightly from the adjacent slit in a direction longitudinally of said film strip, a light sensitive device in the path of light passing through each track and its respective slit, and a second recording device connected to receive the differences in the outputs of predetermined pairs of said light sensitive devices.

ALEXANDER WOLF.

REFERENCES CITED

The following references are of record in the file of this patent:

UNITED STATES PATENTS

| Number | Name | Date |
|---|---|---|
| 1,672,495 | McCollum | June 5, 1928 |
| 2,117,365 | Salvatori et al. | May 17, 1938 |
| 2,148,422 | Blau | Feb. 28, 1939 |
| 2,151,878 | Weatherby | Mar. 28, 1939 |
| 2,156,198 | Scherbatskoy | Apr. 25, 1939 |
| 2,156,624 | Faust | May 2, 1939 |
| 2,167,124 | Minton | July 25, 1939 |
| 2,184,313 | Owen | Dec. 26, 1939 |
| 2,191,121 | Slichter | Feb. 20, 1940 |
| 2,192,972 | Innes | Mar. 12, 1940 |
| 2,202,885 | Zuschlag | June 4, 1940 |
| 2,243,730 | Ellis | May 27, 1941 |